Patented Oct. 3, 1950

2,524,356

UNITED STATES PATENT OFFICE 2,524,356

PLASTICIZED POLYVINYL FORMAL RESIN

William R. Richard, Ann Arbor, Mich., assignor to Monsanto Chemical Company, St. Louis, Mo., a corporation of Delaware No Drawing. Application October 13, 1947, Serial No. 779,658

7 Claims. (Cl. 260—31.8)

This invention relates to polyvinyl formaldehyde acetal resin compositions. More particularly, this invention relates to plasticized polyvinyl formals.

The problem of providing suitable materials for plasticizing polyvinyl formals has proved to be particularly difficult. Thus, in contrast to other acetal resins such as polyvinyl butyrals, only a limited group of compounds have proved to be suitable. One of the chief difficulties has been lack of compatibility of compounds which are successful plasticizers for other high molecular weight materials, as for example, polyvinyl butyrals. Another difficulty has been the tendency of such materials as are sufficiently compatible with polyvinyl formal, to volatilize from the plasticized resin at elevated temperatures.

It is an object of this invention to provide plasticized polyvinyl formal resin compositions. A particular object of this invention is to provide plasticized polyvinyl formals of improved stability at elevated temperatures.

These and other objects are attained according to this invention by incorporating in polyvinyl formal an alkyl dichloro-phthalyl alkyl glycolate in which the alkyl groups contain 1-4 carbon atoms. Thus, it has been discovered that the above-described esters have a high degree of compatibility with polyvinyl formal resin and at the same time a greatly decreased rate of volatilization from the compositions.

The following examples are given in illustration of the present invention, but are not to be considered as limitative thereof. Where parts are mentioned, they are parts by weight.

The polyvinyl formal used in the examples is made by simultaneously hydrolyzing and reacting with formaldehyde a polyvinyl acetate of such a viscosity that a one-molar benzene solution thereof has a viscosity of 15 centipoises at 20° C. The reaction is carried out under such conditions that the product contains 7-9% hydroxyl groups by weight calculated as polyvinyl alcohol, 9-13% acetate groups by weight, calculated as polyvinyl acetate and the balance substantially formaldehyde-acetal.

The esters used in the examples are prepared by reacting phthalic anhydride with chlorine (while dissolved in 15% fuming sulfuric acid) for 32 hours at 40-60° C. according to the method of Villeger, Berichte 42, 3538 (1909). The dichloro-phthalic anhydride so prepared is reacted with the appropriate alkanol in the presence of sulfuric acid catalyst to form mono-alkyl acid phthalate. This acid ester is then converted into the corresponding potassium salt which on reaction with the appropriate alkyl ester of monochloroacetic acid forms the alkyl dichloro-phthalyl alkyl glycolate.

Example I 100 parts of ethyl-dichloro-phthalyl ethyl glycolate are intimately mixed with 100 parts of the polyvinyl formal described above and the mixture pressed into a sheet about 0.020 inch in thickness by subjecting the mixture to the temperature and pressure obtained by the use of steam at 140 pounds per square inch gauge pressure. The resulting sheet is light colored, transparent and flexible.

Example II

Example I is repeated except that the amount of plasticizer is raised to 150 parts. The product is considerably more elastic than the product of Example I but is otherwise generally similar in physical properties.

Example III

Example I is repeated except that 60 parts of propyl dichloro-phthalyl methyl glycolate are used for plasticizing the polyvinyl formal. The product is similar in physical properties to the product of Example I.

In place of the esters used in the examples, other alkyl esters of dichloro-phthalyl glycolic acid may be used in which the alkyl groups contain 1-4 carbon atoms, e. g., propyl-dichloro-phthalyl propyl glycolate, methyl-dichloro-phthalyl methyl glycolate, butyl-dichloro-phthalyl butyl glycolate, ethyl-dichloro-phthalyl butyl glycolate, propyl-dichloro-phthalyl methyl glycolate, etc.

In contrast to the dichloro-phthalyl glycolic acid esters of the invention, the use of corresponding esters free from chlorine gives greatly inferior results. In particular, the plasticizers of the invention show unexpectedly better retentivity in the compositions as compared with the corresponding esters which do not contain chlorine. For example, on heating the sheets of Example I for 5 hours at 105° C., a weight loss of about 1% results. In contrast, substitution of ethyl phthalyl ethyl glycolate results in a weight loss of about 10% under the same conditions.

It is also noted that the compositions of the invention lose far less weight on immersion in water as compared with compositions containing the corresponding phthalate esters free from chlorine. For example, on immersion in water for 48 hours at room temperature, followed by drying, the composition of Example I undergoes a weight loss of about 2% as compared with about 3% when ethyl phthalyl ethyl glycolate is used as the plasticizer in the same amount.

As pointed out above, the alkyl portion of the esters used in the compositions of the invention may contain 1–4 carbon atoms. While the illustrative examples show esters in which both alkyl groups are the same, corresponding esters may be used in which the alkyl groups differ, provided neither contains more than four carbon atoms.

The amount of ester to be incorporated in the polyvinyl formal depends on a number of factors, for example, the intended use for the plasticized resin as well as the presence or absence of other plasticizers. The upper limit of compatibility of the plasticizers of the invention depends not only on the presence or absence of other plasticizers, but upon the nature of the alkyl portion of the molecule. Thus, compatibility decreases as the number of carbon atoms in the alkyl groups increases.

While, as indicated above, the amount of plasticizer depends, at least in part, on the intended use, it is desirable to have present at least 25 parts of plasticizer for every 100 parts of acetal resin and it is expected that the esters of the invention will be generally used in compatible amounts within the range 25–200 parts for every 100 parts of polyvinyl formal. A more preferred range is 50–100 parts of an ester of the invention for every 100 parts of polyvinyl formal.

Examples of plasticizers which may be used in conjunction with the plasticizers of the invention include diacetin, diethyl phthalate, dibutyl tartrate, triethyl citrate, etc. For example, 25–50 parts of one or more of these plasticizers may be used in conjunction with 25–50 parts of one or more plasticizers of the invention in 100 parts of polyvinyl formal.

As is known by those skilled in the art, the composition of polyvinyl formal resins may be varied to a wide extent. This is indicated by U. S. Reissue 20,430 to Morrison et al. For example, the acetal resin may be made from polyvinyl acetate or other polyvinyl ester having widely varying viscosities. Thus, in the case of polyvinyl acetate, the degree of polymerization may be such that a one-molar benzene solution has a viscosity of 5–500 centipoises at 20° C. Corresponding variation in the degree of polymerization of other polyvinyl esters is permissible. As indicated in the Morrison et al. patent referred to above, polyvinyl formals may vary widely with respect to the relative proportion of hydroxyl ester and acetal groups. Among the preferred embodiments for the purposes of this invention are polyvinyl formals containing on a weight basis 0–35% ester groups calculated as polyvinyl ester, 3–15% hydroxyl groups calculated as polyvinyl alcohol and the balance substantially formal acetal. A still more preferred embodiment comprises polyvinyl formals containing 8–15% ester groups calculated as polyvinyl ester, 5–10% hydroxyl groups calculated as polyvinyl alcohol and the balance substantially formaldehyde acetal. In the preferred embodiments set forth above, the preferred ester groups are derived from acetic acid.

It is to be understood that the above description is given by way of illustration only, and not of limitation, and that deviations are possible within the spirit of the invention.

What is claimed is:

1. A composition having improved plasticizer retentivity at elevated temperatures comprising a polyvinyl formal resin plasticized with an alkyl dichloro-phthalyl alkyl glycolate in which each alkyl group contains less than 5 carbon atoms.

2. A composition as defined in claim 1 in which the alkyl groups are ethyl groups.

3. A composition as defined in claim 2 in which 25–200 parts by weight of the ester are used for every 100 parts of polyvinyl formal.

4. A composition as defined in claim 2 in which 100 parts by weight of the ester are used for every 100 parts by weight of polyvinyl formal.

5. A composition as defined in claim 1 in which the alkyl groups are methyl groups.

6. A composition as defined in claim 5 in which the amount of ester does not exceed its compatibility with the acetal resin, but is at least 25 parts for every 100 parts of acetal resin.

7. A composition as defined in claim 1 in which a compatible amount of the ester is used, but said amount is at least 25 parts for every 100 parts of polyvinyl formal.

WILLIAM R. RICHARD.

REFERENCES CITED

The following references are of record in the file of this patent:

UNITED STATES PATENTS

| Number | Name | Date |
| --- | --- | --- |
| 2,072,739 | Dykstra | Mar. 2, 1937 |
| 2,184,426 | Kocher | Dec. 26, 1939 |